United States Patent [19]

Anderson

[11] 4,263,206

[45] Apr. 21, 1981

[54] REACTIVE DYESTUFFS CONTAINING CHLORINE OR FLUORINE SUBSTITUENTS AND ONE OR MORE 1,3-DICYANOBENZENE RADICALS LINKED TO THE DYESTUFF AT THE 2-, 4- OR 6-POSITION

[75] Inventor: Brian Anderson, Manchester, England

[73] Assignee: Imperial Chemical Industries Limited, London, England

[21] Appl. No.: 19,404

[22] Filed: Mar. 12, 1979

[30] Foreign Application Priority Data

May 4, 1978 [GB] United Kingdom ............... 17778/78

[51] Int. Cl.³ .................. C09B 1/34; C09B 19/00; C09B 29/30; C09B 31/072; C09B 33/044; C09B 45/08; C09B 45/18; C09B 50/00
[52] U.S. Cl. .................... 260/195; 260/206; 260/146 R; 260/207; 260/207.1; 260/147; 260/314.5; 260/371; 260/148; 260/372; 260/374; 260/150; 260/465 G; 260/507 A; 260/151; 260/508; 260/510; 260/152; 260/149; 544/76; 260/155; 544/348; 564/87; 260/156; 564/95; 564/166; 260/157; 564/346; 564/374; 260/158; 564/384; 564/434; 260/162; 260/163; 260/174; 260/175; 260/176; 260/178; 260/183; 260/184; 260/185; 260/186; 260/187; 260/190; 260/191; 260/194; 260/196; 260/197; 260/198; 260/199; 260/200; 260/201; 260/202; 260/205
[58] Field of Search ............... 260/148, 146, 147, 149, 260/150, 151, 155, 152, 178, 156, 157, 158, 162, 163, 174, 175, 176, 183, 184, 185, 186, 187, 190, 191, 194, 195, 196, 197, 198, 199, 200, 201, 202, 205, 206, 207, 207.1, 314.5, 371, 372, 374, 507 A, 508, 510, 576, 577, 578; 544/76, 348

[56] References Cited
U.S. PATENT DOCUMENTS

| | | | |
|---|---|---|---|
| 3,268,507 | 8/1966 | Kruckenberg | 260/207.1 |
| 3,274,173 | 9/1966 | Dehn et al. | 260/205 |
| 3,301,847 | 1/1967 | Mangini et al. | 260/184 |
| 4,053,465 | 10/1977 | Kruckenberg | 260/207.3 |

FOREIGN PATENT DOCUMENTS

| | | | |
|---|---|---|---|
| 2205537 | 8/1973 | Fed. Rep. of Germany | 260/207.1 |
| 2443482 | 3/1976 | Fed. Rep. of Germany | 260/207.1 |
| 2,454,518 | 5/1976 | Fed. Rep. of Germany | 260/207.1 |
| 1304825 | 8/1962 | France | 260/162 |

*Primary Examiner*—Floyd D. Higel
*Attorney, Agent, or Firm*—Cushman, Darby & Cushman

[57] ABSTRACT

Dyestuffs are provided which contain one or more 1,3-dicyanobenzene radicals linked to the dyestuff at the 2-, 4- or 6-position, with halogen substituents in both of the remaining two of these positions and an electron-attracting substituent in the 5-position. These dyestuffs reactively dye cellulose at low temperatures and are less prone to "acid-bleeding" than some known reactive dyes. More particularly, those dyestuffs have the formula:

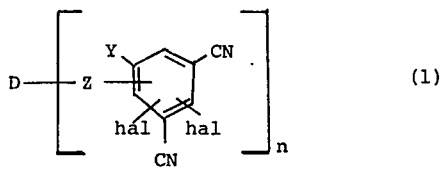

(1)

where
D is a chromophoric group
n is 1 or 2, $$Z \text{ is } \underset{N}{\overset{R}{|}}$$

where R is H, $C_{1-4}$alkyl, $C_{1-4}$alkyl substituted by OH, $OSO_3H$, CN or $SO_3H$ or is phenyl.

Each hal independently represents a chlorine or fluorine atom occupying one of the remaining 2-, 4- and 6-positions of the benzene nucleus, and Y is H, F, Cl, CN, $NO_2$ or $SO_3H$.

5 Claims, No Drawings

REACTIVE DYESTUFFS CONTAINING CHLORINE OR FLUORINE SUBSTITUENTS AND ONE OR MORE 1,3-DICYANOBENZENE RADICALS LINKED TO THE DYESTUFF AT THE 2-, 4- OR 6-POSITION

This invention relates to new reactive dyes in particular to dyes containing one or more halogeno-1,3-cyanobenzene residues.

It is well-known to produce dyestuffs containing groups which are reactive to substrates containing active hydrogen atoms, e.g. in the form of hydroxyl groups such as cellulose. These so-called reactive dyes form a covalent bond with the substrate when applied under alkaline conditions. Generally these dyes are associated with extremely good fastness in respect to washing. The temperature at which a reactive dye fixes to a substrate is controlled by the reactivity of the reactive group present. In some cases fixation may be achieved at low temperature, e.g. room temperatures to 40° C. thus giving the advantage of simple, cheap processing. However some such low temperature fixing dyes containing azo chromophores show the disadvantage of forming loose dye when subjected to moist acidic conditions. This effect is known as "acid-bleeding" and can manifest itself as loss of colour and staining of adjacent materials.

We have now discovered a novel halophenyl reactive group which when present in dyestuffs often confers an improved balance of properties especially an improved combination of low temperature fixing characteristics and resistance to acid-bleeding.

According to the present invention there are provided dyestuffs containing one or more 1,3-dicyanobenzene radicals linked to the dyestuff at the 2-, 4- or 6-position, with halogen substituents in both of the remaining two of these positions and H or an elecron-attracting substituent in the 5- position.

The halogen substituents may be different but it is usually preferred that they are the same. The preferred halogens are chlorine and more especially fluorine.

As electron-attracting substituents there may be mentioned halogens especially F and Cl, CN, $NO_2$ and $SO_3H$.

A preferred class of dyestuffs of the present invention may be represented by the formula:

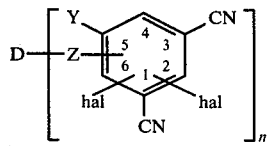 (1)

where
D is a chromophoric residue,
n is a positive integer
Z is O, S or 

linked to the 2-, 4- or 6-position of the benzene nucleus, R is H, optionally substituted alkyl or optionally substituted aryl, each hal independently represents a halogen atom occupying one of the remaining 2-, 4- and 6-positions of the benzene nucleus, and
Y is H or an electron-attracting substituent.

It is usually preferred that the dyestuff contains sufficient substituents such as $SO_3H$ to give it significant water-solubility, e.g. at least 5 grams per liter.

A particularly preferred class of dyestuffs of formula (1) are those in which $n=1$ or 2,

where R is $C_{1-4}$alkyl or $C_{1-4}$alkyl substituted by OH, $OSO_3H$, CN or $SO_3H$; or phenyl or especially H, both hal are Cl or especially F, and
Y is an electron-attracting substituent especially F, Cl or Cn.

The symbol D may represent a chromophoric residue of any of the dyestuff series, e.g. of the azo, anthraquinone, phthalocyanine, formazan, nitroarylamine, oxazine, azine triphenylmethane or xanthene series. The group Z linking the halogeno-1,3-cyanobenzene nucleus to D is itself preferably attached to a carbon atom in D which may be part of an aromatic radical but it is usually preferred that Z is attached to a carbon atom not being part of a structure having aromatic character, e.g. Z is attached to a non-conjugated aliphatic or cycloaliphatic carbon atom.

Thus an especially preferred class of dyes are those represented by the formula (1) in which the chromophoric residue D is capable of being represented in the form $D^1$—W— where $D^1$ is a chromophoric residue linked at an aromatic carbon atom and W is a non-conjugated aliphatic or cycloaliphatic group linked to Z by a carbon atom of the form —$CHR^2$— where $R^2$ is lower alkyl or more especially H.

Preferred forms of W are represented by the formula Q—$W^1$ where $W^1$ is an alkylene chain of 1 to 6 carbon atoms optionally interrupted by O or S and Q is a direct link, O, CO, $SO_2$, $CONR^3$, $NR^3CO$, $SO_2NR^3$, $NR^3SO_2$ or $N(COR^3)$ where $R^3$ is $C_{1-4}$-alkyl or H.

The group Q-$W^1$ is attached to $D^1$ via Q. It is usually preferred that $W^1$ is $CH_2$ or $CH_2CH_2$ and that Q is a direct link or $NR^3CO$.

As examples of W there may be mentioned:
$CH_2$
$CH_2CH_2$
$CH_2CH_2OCH_2CH_2$
$NH.COCH_2CH_2$
$N(COCH_3)CH_2CH_2$
$NCH_3.COCH_2CH_2$
$NHSO_2CH_2CH_2$
$CONHCH_2$
$SO_2NHCH_2CH_2$
$OCH_2CH_2$
$SO_2CH_2CH_2$
$COCH_2CH_2$ The present invention further provides a process for the manufacture of dyes of formula (1) which comprises reacting a chromophoric compound containing n groups of the formula OH, SH or

with n moles of a compound of the formula:

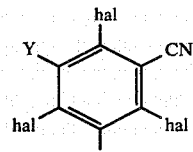
(2)

wherein n, R, Y and hal have the meanings given above.

The above reaction may conveniently be carried out in aqueous medium optionally containing water-miscible organic solvent at, for example, a temperature of 0° C. to 80° C. maintaining the pH at from 3 to 12, by addition of an acid-binding agent such as sodium carbonate bicarbonate or hydroxide.

The reactive dyestuff prepared in the process of the invention may be isolated by any convenient known method such as spray drying or precipitation and filtration. The aqueous reaction mixture containing the dyestuff of formula (1) may, in some instances, be conveniently employed in preparing, for example, dyeing liquors without isolation of the solid dyestuff. When, as is often the case, the dyestuff contains acidic solubilising groups such as $SO_3H$ it is usually convenient to isolate the dyestuff with these groups, at least partially, in the form of salts, e.g. sodium salts.

As examples of chromophoric compounds containing n groups of the

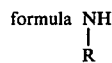

formula which may be used in the process of the invention there may be mentioned coloured compounds of the following classes:

(i) Anthraquinone compounds of the formula:

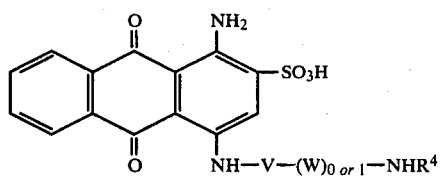
(3)

wherein the anthraquinone nucleus may contain an additional sulphonic acid group in the 5-, 6-, 7- or 8-position and V represents a bridging group which is preferably a divalent radical of the benzene series, for example phenylene, diphenylene or 4,4'-divalent stilbene or azobenzene radicals, W has the meaning given above and $R^4$ is H or $C_1$-$C_4$ alkyl. It is preferred that V should contain one sulphonic acid group for each benzene ring present.

(ii) Monoazo compounds of the formula:

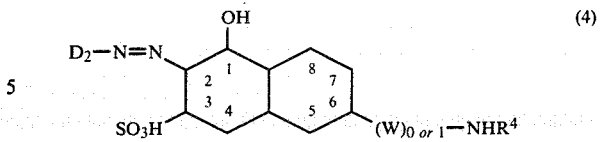
(4)

wherein $D_2$ represents a mono- or dicyclic aryl radical which is free from azo groups and $NHR^4$ groups, the $(W)_{0\ or\ 1}$—$NHR^4$ group is preferably attached to the 6-, 7- or 8-position of the naphthalene nucleus, and which may contain a sulphonic acid group in the 5- or 6-position of the naphthalene nucleus.

$D_2$ may represent a radical of the naphthalene or benzene series which is free from azo substituents, for example a stilbene, diphenyl, benzthiazolyl/phenyl or diphenylamine radical. Also in this class are to be considered the related dyestuffs in which the $NHR^4$ group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_2$ represents a sulphonated phenyl or naphthyl radical, especially those which contain a —$SO_3H$ group in ortho position to the azo link; the phenyl radical may be further substituted, for example by halogen atoms such as chlorine, alkyl radicals such as methyl, acylamino groups such as acetylamino and alkoxy radicals such as methoxy.

(iii) Disazo compounds of formula (4), wherein $D_2$ stands for a radical of the azobenzene, azonaphthalene or phenylazonaphthalene series and the naphthalene nucleus is substituted by the $NHR^4$ group, and optionally by sulphonic acid as in class (ii).

(iv) Mono- or disazo compounds of the formula:

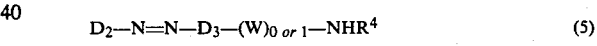
$$D_2—N=N—D_3—(W)_{0\ or\ 1}—NHR^4 \quad (5)$$

wherein $D_2$ stands for a radical as defined for class (ii) or class (iii) and $D_3$ is a 1:4-phenylene or a sulpho-1:4-naphthylene or a stilbene radical; the benzene nuclei in $D_2$ and $D_3$ may contain further substituents such as halogne atoms, or alkyl, alkoxy, carboxylic acid and acylamino groups.

(v) Mono- or disazo compounds of the formula:

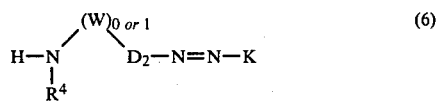
(6)

wherein $D_2$ represents an arylene radical such as a radical of the azobenzene, azonaphthalene or phenylazonaphthalene series, or preferably, an at most dicyclic arylene radical of the benzene or naphthalene series, and K represents the radical of a naphthol sulphonic acid or the radical of an enolised or enolisable ketomethylene compound (such as an acetoacetarylide, 5-pyrazolone or 6-hydroxypyrid-2-one) having the OH group ortho to the azo group. $D_2$ preferably represents a radical of the benzene series containing a sulphonic acid group.

(vi) Mono- or disazo compounds of the formula:

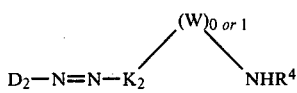

(7)

wherein $D_2$ represents a radical of the types defined for $D_2$ in classes (ii) and (iii) above and $K_2$ represents the radical of an enolisable ketomethylene compound (such as an acetoacetarylide or a 5-pyrazolone) having the OH group in α-position to the azo group.

(vii) 1:1-Metal complex, especially the copper complex, compounds of those dyes of formula 4, 6 and 7 (wherein $D_2$, K and $K_2$ have all the respective meanings stated) which contain a metallisable (for example a hydroxy, lower alkoxy or carboxylic acid) group ortho to the azo group in $D_2$.

(viii) Phthalocyanine compounds of the formula:

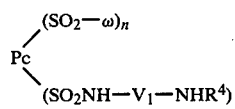

(8)

wherein Pc represents the phthalocyanine nucleus preferably of copper phthalocyanine, ω represents a hydroxy and/or a substituted or unsubstituted amino group, $V_1$ represents a bridging group, preferably an aliphatic, cycloaliphatic or aromatic bridging group, n represents 1, 2 or 3.

(ix) Nitro dyestuffs of the formula:

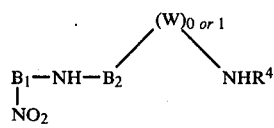

(9)

wherein $B_1$ and $B_2$ represents monocyclic aryl nuclei, the nitro group in $B_1$ being ortho to the NH group.

(x) Formazan dyestuffs of the formula:

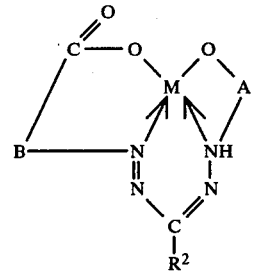

(10)

wherein M is Cu or Ni, A and B are mono or polynuclear aryl groups in which the links shown are from carbon atoms ortho to each other, the group $R^2$ is an optionally substituted hydrocarbyl group and one of the groups A, B or $R^2$ bears a group $$-\underset{R^4}{\underset{|}{N}}-H \text{ or } -W-\underset{R^4}{\underset{|}{N}}H$$

(xi) Nitro-stilbene dyestuffs of the formula:

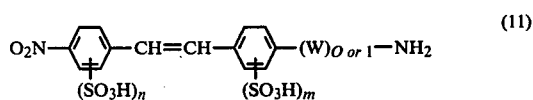

(11)

wherein n and m are each independently 1 or 2.
(xii) Triphendioxazine dyes of the formula:

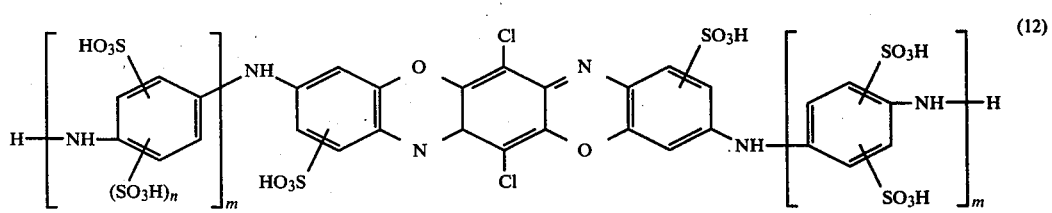

(12)

in which m=0 or 1 and n=0 or 1, or

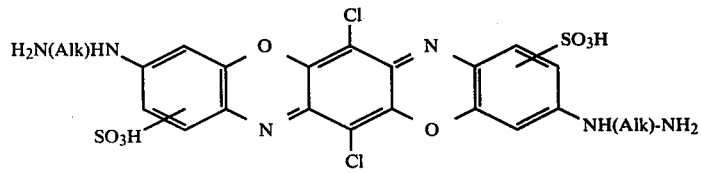

where Alk=an alkylene group preferably of 2-6 carbon atoms.

(xiii) Phenazine dyes of the formula:

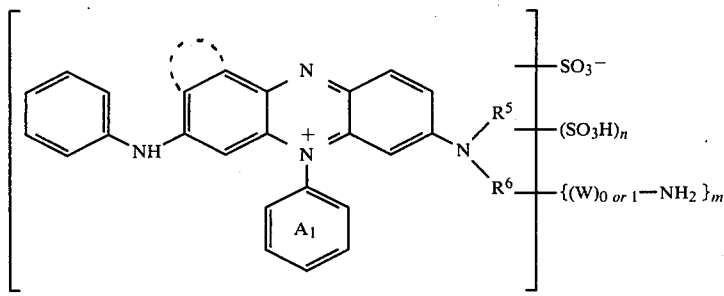

wherein
n is 1 or 2 and m is 1 or 2
$R^5$ is H or optionally substituted $C_1-C_4$alkyl
$R^6$ is optionally substituted $C_1-C_4$alkyl, optionally substituted aralkyl or optionally substituted aryl, and the benzene ring $A_1$ can be further substituted, e.g. by Cl, $CH_3$ or $OCH_3$.

As particular examples of compounds of classes (i) to (xiii), there may be mentioned:

In class (i)

1-amino-4-(4'-aminoanilino)anthraquinone-2,2'-disulphonic acid
1-amino-4-(4'-methylaminoanilino)anthraquinone-2:3'-disulphonic acid
1-amino-4-(3'-amino-2':4':6'-trimethylanilino)anthraquinone-2,5-disulphonic acid
1-amino-4-(4'-aminoacetylaminoanilino)anthraquinone-2,2'-disulphonic acid In class (ii)

6-amino-1-hydroxy-2-(2'-sulphophenylazo)naphthalene-3-sulphonic acid
8-amino-1-hydroxy-2-(2'-sulphophenylazo)naphthalene-3:6-disulphonic acid
7-amino-2-(2':5'-disulphophenylazo)-1-hydroxynaphthalene-3-sulphonic acid
7-methylamino-2-(2'-sulphophenylazo)-1-hydroxynaphthalene-3-sulphonic acid
7-methylamino-2-(4'-methoxy-2'-sulphophenylazo)-1-hydroxynaphthalene-3-sulphonic acid
8-(3'-aminobenzoylamino)-1-hydroxy-2-(2'-sulphophenylazo)naphthalene-3:6-disulphonic acid
8-amino-1-hydroxy-2:2'-azonaphthalene-1':3:5':6-tetrasulphonic acid
6-amino-1-hydroxy-2-(4'-acetylamino-2'-sulphophenylazo)naphthalene-3-sulphonic acid
6-methylamino-1-hydroxy-2-(4'-methoxy-2'-sulphophenylazo)naphthalene-3-sulphonic acid
8-amino-1-hydroxy-2-phenylazonaphthalene-3:6-disulphonic acid
8-amino-1-hydroxy-2:2'-azonaphthalene-1':3:6-trisulphonic acid
6-amino-1-hydroxy-2-(4'-methoxy-2'-sulphophenylazo)-naphthalene-3-sulphonic acid
8-amino-1-hydroxy-2:2'-azonaphthalene-1':3:5'-trisulphonic acid
6-amino-1-hydroxy-2:2'-azonaphthalene-1',3,5'-trisulphonic acid
6-methylamino-1-hydroxy-2:2'-azonaphthalene-1':3:5'-trisulphonic acid
7-amino-1-hydroxy-2:2'-azonaphthalene-1':3-disulphonic acid
8-amino-1-hydroxy-2-(4'-hydroxy-3'-carboxyphenylazo)naphthalene-3:6-disulphonic acid
6-amino-1-hydroxy-2-(4'-hydroxy-3'-carboxyphenylazo)-naphthalene-3:5-disulphonic acid
1-hydroxy-2-(1'-sulphonaphth-2'-ylazo)-8-ω-(N-butylamino)propionylaminonaphthalene-3,6-disulphonic acid
1-hydroxy-2-(1'-sulphonaphth-2'-ylazo)-8-ω-(N-methylamino)acetylaminonaphthalene-3,5-disulphonic acid
1-hydroxy-2-(1'sulphonaphth-2'-ylazo)-8-ω-(n-methylamino)-acetylaminonaphthalene-3,6-disulphonic acid
1-hydroxy-2-(2'-sulphophenylazo)-8-ω-(N-methylamino)acetylaminonaphthalene-3,6-disulphonic acid
1-hydroxy-2-(1',5'-disulphonaphth-2'-ylazo)-8-ω-(N-methylamino)acetylaminonaphthalene-3,6-disulphonic acid
1-hydroxy-2-phenylazo-8-ω-(N-methylamino)acetylaminonaphthalene-3,6-disulphonic acid
1-hydroxy-2-(4'-methoxy-2'-sulphophenylazo)-8-ω-(N-methylamino)acetylaminonaphthalene-3,6-disulphonic acid
1-hydroxy-2-(2',5'-disulphophenylazo)-8-ω-(N-methylamino)acetylaminonaphthalene-3,6-disulphonic acid
1-hydroxy-2-(1'-sulphonaphth-2'-ylazo)-;b 8-ω-aminoacetylaminonaphthalene-3,6-disulphonic acid
1-hydroxy-2-(1'-sulphonaphth-2'-ylazo)-8-ω-aminopropionylaminonaphthalene-3,6-disulphonic acid
1-hydroxy-2-(1',5'-disulphonaphth-2'-ylazo)-6-ω-(N-methylamino)acetylaminonaphthalene-3-sulphonic acid
1-hydroxy-2-(1',5'-disulphonaphth-2'-ylazo)-6-ω-(N'-methylamino)acetyl-N-methylaminonaphthalene-3-sulphonic acid
1-hydroxy-2-(1',5'-disulphonaphth-2'-ylazo)-7-ω-(N-methylamino)acetylaminonaphthalene-3-sulphonic acid
1-hydroxy-2-(1'-sulphonaphth-2'-ylazo)-ω-(N-propylamino)acetylaminonaphthalene-3,6-disulphonic acid
1-hydroxy-2-(1'-sulphonaphth-2'-ylazo)-8-ω-(N-butylamino)acetylaminonaphthalene-3,6-disulphonic acid
1-hydroxy-2-(1'-sulphonaphth-2'-ylazo)-8-ω-(N-benzylamino)acetylaminoaphthalene-3,6-disulphonic acid

In class (iii)

8-amino-1-hydroxy-2-[4'-(2''-sulphophenylazo)-2'-methoxy-5'-methylphenylazo]naphthalene-3:6-disulphonic acid 4:4'-bis(8''-amino-1''-hydroxy-3'':6''-disulpho-2''naphthylazo)-3:3'-dimethoxydiphenyl 6-amino-1-hydroxy-2-[4'-(2''-sulphophenylazo)-2'-methoxy-5'-methylphenylazo]naphthalene-3:5-disulphonic acid 8-ω-(N-methylamino)acetylamino-1-hydroxy-2-[4'-(2'',5''-disulphophenylazo)-2'-methoxy-5'-methylphenylazo]naphthalene-3,6-disulphonic acid 4,4'-bis[8''-ω-(N-methylamino)acetylamino-1''-hydroxy-3'',6''-disulphonaphth-2''-ylazo]-3,3'-dimethoxydiphenyl

In class (iv)

2-(4'-amino-2'-methylphenylazo)naphthalene-4:8-disulphonic acid 2-(4'-amino-2'-acetylaminophenylazo)naphthalene-5:7-disulphonic acid 2-(4'-amino-2'-ureidophenylazo)naphthalene-3:6:8-trisulphonic acid 4-nitro-4'-(4''-methylaminophenylazo)stilbene-2:2'-disulphonic acid 4-nitro-4'-(4''-amino-2''-methyl-5''-ω-methoxyphenylazo)-stilbene-2:2-disulphonic acid 2-(4'-amino-2'-acetylaminophenylazo)naphthalene-4:8-disulphonic acid 4-amino-2-methylazobenzene-2':5'-disulphonic acid 4-[4'-(2'',5''-disulphophenylazo)-2',5'-dimethylphenylazo]-1-naphthylamine-8-sulphonic acid 4-[4'-(2'',5'',7''-trisulphonaphth-1''-ylazo)-2',5'-dimethylphenylazo]-1-naphthylamine-6-sulphonic acid 2-(4'-methylaminoacetylamino-2'-ureidophenylazo)-naphthalene-3,6,8-trisulphonic acid 4-[4'-(2'',5'',7''-trisulphonaphth-1''-ylazo)-2',5'-dimethylphenylazo]-1-naphthylamine-7-sulphonic acid 4-[4'-(2'',5'',7''-trisulphonaphth-1''-ylazo)naphth-1'-ylazo]-1-naphthylamine-6-sulphonic acid 4-[4'-(2'',5''-disulphophenylazo)-6'-sulphonaphth-1-ylazo]-1-naphthylamine-8-sulphonic acid 4-[4'-(4''-sulphophenylazo)-2'-sulphophenylazo]-1-naphthylamine-6-sulphonic acid

In class (v)

1-(2',5'-dichloro-4'-sulphophenyl)-3-methyl-4-(3''-amino-4''-sulphophenylazo)-5-pyrazolone 1-(4'-sulphophenyl)-3-carboxy-4-(4''-amino-3''-sulphophenylazo)-5-pyrazolone 1-(2'-methyl-5'-sulphophenyl)-3-methyl-4-(4''-amino-3''-sulphophenylazo)-5-pyrazolone 1-(2'-sulphophenyl)-3-methyl-4-(3''-amino-4''-sulphophenylazo)-5-pyrazolone 4-amino-4'-(3''-methyl-5''-oxo-1''-phenylpyrazolin-4''-ylazo)stilbene-2:2'-disulphonic acid 4-amino-4'-(2''-hydroxy-3'',6''-disulpho-1''-naphthylazo)stilbene-2:2'-disulphonic acid 8-acetylamino-1-hydroxy-2-(3'-amino-4'-sulphophenylazo)naphthalene-3:6-disulphonic acid 7-(3'-sulphophenylamino)-1-hydroxy-2-(4'-amino-2'-carboxyphenylazo)naphthalene-3-sulphonic acid 8-phenylamino-1-hydroxy-2-(4'-amino-2'-sulphophenylazo)naphthalene-3:6-disulphonic acid 6-acetylamino-1-hydroxy-2-(5'-amino-2'-sulphophenylazo)naphthalene-3-sulphonic acid 6-ureido-1-hydroxy-2-(5'-amino-2'-sulphophenylazo)-naphthalene-3-sulphonic acid 8-benzoylamino-1-hydroxy-2-(5'-amino-2'-sulphophenylazo)naphthalene-3:6-disulphonic acid p0 1-(4':8'-disulphonaphth-2'-yl)-3-methyl-4-(5''-amino-2''-sulphophenylazo)-5-pyrazolone 1-(2'-sulphophenyl)-3-carboxy-4-(5''-amino-2''-sulphophenylazo)-5-pyrazolone 1-(2':5'-dichloro-4'-sulphophenyl)-3-methyl-4-(5''-amino-2''-sulphophenylazo-5-pyrazolone 5-(3'-amino-4'-sulphophenylazo)-4-methyl-5-cyano-6-hydroxypyrid-2-one 5-(3'-amino-4'-sulphophenylazo)-4-methyl-5-carbonamido-6-hydroxy-N-ethylpyrid-2-one 5-(3'-amino-4'-sulphophenylazo)-4-methyl-6-hydroxypyrid-2-one 5-(3'-amino-4'-sulphophenylazo)-4-methyl-5-cyano-6-hydroxy-N-methylpyridone 5-(4'-amino-3'-sulphophenylazo)-4-methyl-5-cyano-6-hydroxy-N-ethylpyridone 5-(4'-amino-2',5'-disulphophenylazo)-4-methyl-5-cyano-6-hydroxy-N-ethylpyridone 5-(3-amino-4-sulphophenylazo)-3,4-dimethyl-6-hydroxy-1-n-propylpyrid-2-one 5-(4-amino-2,5-disulphophenylazo)-1-n-butyl-6-hydroxy-4-methyl-3-sulphomethylpyrid-2-one 5-(3-amino-4-sulphophenylazo)-1-ethyl-6-hydroxy-4-methyl-3-sulphopyrid-2-one 5-(3-amino-4-sulphophenylazo)-3-chloro-1-ethyl-6-hydroxy-4-methylpyrid-2-one 5-(3-amino-4-sulphophenylazo)-3-cyano-1-ethyl-6-hydroxy-4-sulphomethylpyrid-2-one 5-(3-amino-4-sulphophenylazo)-3-aminocarbonyl-6-hydroxy-4-methyl-1-[2-(4-sulphophenyl)ethyl]pyrid-2-one 1-hydroxy-2-(1'-sulpho-5'-aminomethylnaphth-2'-ylazo)-8-benzoylaminonaphthalene-3,6-disulphonic acid 1-(2',5'-dichloro-4'-sulphophenyl)-3-methyl-4-(1''-sulpho-5''-aminomethylnaphth-2''-ylazo)-5-pyrazolone 1(4'-sulphophenyl)-3-carboxy-4(1'-sulpho-5''-aminomethylnaphth-2''-ylazo)-5-pyrazolone 1-hydroxy-2-(1'-sulpho-5'-aminomethylnaphth-2'-ylazo)-6-acetylaminonaphthalene-3-sulphonic acid 1-hydroxy-2-(1'-sulpho-5'-aminomethylnaphth-2'-ylazo)-8-benzoylaminonaphthalene-3,5-disulphonic acid 1-hydroxy-2-(1'-sulpho-5'-aminomethylnaphth-2'-ylazo)-6-(N-acetyl-N-methylamino)naphthalene-3-sulphonic acid 1-hydroxy-2-(1'-sulpho-5'-aminomethylnaphth-2'-ylazo)-7-acetylaminonaphthalene-3-sulphonic acid 1-hydroxy-2-[4'-(1''-sulpho-5''-aminomethylnaphth-2''-ylazo)-6'-sulphonaphth-1-ylazo]-8-acetylaminonaphthalene-3,6-disulphonic acid 1-hydroxy-2-(1'-sulpho-5'-aminomethylnaphth-2'-ylazo)-7-(2'',5''-disulphophenylazo)-8-aminonaphthalene-3,6-disulphonic acid 1-hydroxy-2-(1'-sulpho-5'-aminomethylnaphth-2'-ylazo)-8-acetylaminonaphthalene-3,6-disulphonic acid 1hydroxy-2-[4''-(5''-aminomethyl-4''-methyl-2''-sulphophenylazo)-6'-sulphonaphth-1-ylazo]-6-acetylaminonaphthalene-3-sulphonic acid 5-(5'-aminoethyl-4'-methyl-2'-sulphophenylazo)-1-ethyl-6-hydroxy-4-methyl-3-sulphopyrid-2-one 1-hydroxy-2,5'-aminomethyl-4'''-methyl-2''-sulphophenylazo)-7-(1'', 5'''-disulphonaphth-2''-ylazo)-8-aminonaphthalene-3,6-disulphonic acid
1hydroxy-2-(4'-aminoacetylphenylazo)-6-acetylaminonaphthalene-3,5-disulphonic acid
1-hydroxy-2-[4'-(4''-aminomethyl-2''-sulphophenylazo)-2'-methoxyphenylazo]naphthalene-3,6,8-trisulphonic acid
1-(4'-sulphophenyl)-3-carboxy-4-(4''-methylaminoacetylamino-2''-sulphophenylazo)-5-pyrazolone
1-(3'-methylaminoacetylaminophenyl)-3-carboxy-4-(1'',5''-disulphonaphth-2''-ylazo)-5-pyrazolone
1-hydroxy-2-(4''-β-aminoethylphenylazo)-8-acetylaminonaphthalene-3:6-disulphonic acid
1-hydroxy-2-4'-N-β-aminoethyl-N-acetylaminophenylazo)-8-acetylaminonaphthalene-3:6-disulphonic acid
1-hydroxy-2-(4'-aminomethylphenylazo)-6-acetylaminonaphthalene-3:5-disulphonic acid
1-hydroxy-2-(3'-β-aminoethylsulphonylphenylazo)-6-acetylaminonaphthalene-3:5-disulphonic acid
1-hydroxy-2-(3'-β-aminoethylsulphonylphenylazo)-8-acetylaminonaphthalene-3:6-disulphonic acid
1-hydroxy-2-(4'-β-aminoethylcarbamoylphenylazo)-8-acetylaminonaphthalene-3:6-disulphonic acid
1-hydroxy-2-(3'-β-aminoethylcarbonylphenylazo)-6-acetylaminonaphthalene-3:5-disulphonic acid
1-hydroxy-2-(3'-β-aminoethylsulphamoylphenylazo)-8-acetylaminonaphthalene-3:6-disulphonic acid
1-hydroxy-2-(1'-sulpho-5'-β-aminoethylsulphamoyl-naphth-2-ylazo)-8-benzoylamino-3:6-disulphonic acid
1-hydroxy-2-(1'-sulpho-5'-β-aminoethylsulphamoyl-naphth-2-ylazo)-8-acetylamino-3:5-disulphonic acid In class (vi)

1-(3'-aminophenyl)-3-methyl-4-(2':5'-disulpho-phenylazo)-5-pyrazolone
1-(3'-aminophenyl)-3-carboxy-4-(2'-carboxy-4'-sulpho-phenylazo)-5-pyrazolone
1-(3'-aminoacetylaminophenyl)-3-methyl-4-(2',5'-disulphophenylazo)-5-pyrazolone
4-amino-4'-[3''-methyl-4''-(2''':5''''-disulphophenylazo)-1''-pyrazol-5''-onyl]stilbene-2:2'-disulphonic acid
1-(3'-aminophenyl)-3-carboxy-4-[4''-(2''':5''''-disulpho-phenylazo)-2''-methoxy-5''-methylphenylazo]-5-pyrazolone
1-(2-aminoethyl-3-(1,5-disulphonaphth-2-ylazo)-6-hydroxy-4-methylpyrid-2-one 1-(2-aminoethyl)-3,4-dimethyl-5-(1,5-disulphonaphth-2-ylazo)-6-hydroxy-pyrid-2-one
3-aminocarbonyl-1-(2-aminoethyl)-6-hydroxy-4-methyl-5-(3,6,8-trisulphonaphth-2-ylazo)-pyrid-2-one
1-(2-aminoethyl)-3-cyano-5-(2,5-disulphophenylazo)-6-hydroxy-4-methylpyrid-2-one In class (vii)

The copper complex of 8-amino-1-hydroxy-2-(2'-hydroxy-5'-sulphoohenylazo)naphthalene-3:6-disulphonic acid.
The copper complex of 6-amino-1-hydroxy-2-(2'-hydroxy-5'-sulphophenylazo)naphthalene-3-sulphonic acid.
The copper complex of 6-amino-1-hydroxy-2-(2'-hydroxy-5'-sulphophenylazo)naphthalene-3:5-disulphonic acid.
The copper complex of 8-amino-1,1'-dihydroxy-2,2'-azonaphthalene-3,4', 6,8'-tetrasulphonic acid.
The copper complex of 8-amino-1-hydroxy-2-[4'-(2''-sulphophenylazo)-2'-methoxy-5'-methylphenylazo]-naphthalene-3:6-disulphonic acid.
The copper complex of 6-amino-1-hydroxy-2-[4'-(2'':5'''-disulphophenylazo)-2'-methoxy-5'-methylphenylazo]naphthalene-3,5-disulphonic acid.
The copper complex of 1-(3'-amino-4'-sulphophenyl)-3-methyl-4-[4''-(2''':5''''-disulphophenylazo)-2''-methoxy-5''-methylphenylazo]-5-pyrazole.
The copper complex of 7-(4'-amino-3'-sulphoanilino)-1-hydroxy-2-[4''-(2''':5''''-disulphophenylazo)-2''-methoxy-5''-methylphenylazo]naphthalene-3-sulphonic acid.
The copper complex of 6-(4'-amino-3'-sulphoanilino)-1-hydroxy-2-(2''-carboxyphenylazo)naphthalene-3-sulphonic acid.
The copper complex of 1-hydroxy-2-[4'-(5''-aminomethyl-4''-methyl-2''-sulphophenylazo)-5'-methyl-2'-hydroxyphenylazo]-8-acetylaminonaphthalene-3,6-disulphonic acid.
The copper complex of 1-hydroxy-2-(3'-chloro-5'-sulpho-2'-hydroxyphenylazo)-8-ω-(N-methylamino)acetylaminonaphthalene-3,6-disulphonic acid.
The copper complex of 1-hydroxy-2-(3',5'-disulpho-2'-hydroxyphenylazo)-6-ω-(N-methylamino)acetylaminonaphthalene-3-sulphonic acid.
The trisodium salt of the copper complex of 1-hydroxy-2-[4'-(2'',5''-disulphophenylazo)-5'-methyl-2'-hydroxyphenylazo]-6-ω-(N-methylamino)acetylaminonaphthalene-3-sulphonic acid.

In class (viii)

3-(3'-amino-4'-sulphophenyl)sulphamyl copper phthalocyanine-tri-3-sulphonic acid
4-(3'-amino-4'-sulphophenyl)sulphamyl copper phthalocyanine-tri-4-sulphonic acid
3-(3'- or 4'-aminophenyl)sulphamyl copper phthalocyanine-3-sulphonamide-di-3-sulphonic acid
3-(2-aminoethyl)sulphamyl copper phthalocyanine-tri-3-sulphonic acid In class (ix)

4-amino-2'-nitrodiphenylamine-3:4'-disulphonic acid
4-ω-(N-methylamino)acetylamino-2'-nitrodiphenylamine-3,4'-disulphonic acid In class (x)

The copper complex of N-(2-hydroxy-5-sulpho-3-aminophenyl)-N'-(2'-carboxy-4'-sulphophenyl)-ms-phenylformazan.
The copper complex of N-(2-hydroxy-5-sulpho-3-aminophenyl)-N'-(2'-carboxy-4'-sulphophenyl)-ms-(4''-sulphophenyl)formazan.
The copper complex of N-(2-hydroxy-5-sulphophenyl)-N'-(2'-carboxy-4'-aminophenyl-ms-(2''-sulphophenyl)formazan.
The copper complex of N-(2-hydroxy-5-sulphophenyl)-N'-(2'-carboxy-4'-aminophenyl)-ms-(2''-chloro-5''-sulphophenyl)formazan.
The copper complex of N-(2-hydroxy-5-sulphophenyl)-N'-(2'-carboxy-4'-sulphophenyl)ms-(4''-aminophenyl)formazan.
The copper complex of N-(2-hydroxy-5-sulphophenyl)-N'-(2'-carboxy-4'-sulphophenyl)-ms-(4''-amino-2''-sulphophenyl)formazan.

The copper complex of N-(2-carboxy-4-aminophenyl-N'-(2'-hydroxy-4'-sulphonaphth-1'-yl)-ms-(2"-sulphophenyl)formazan.

The copper complex of N-(2-hydroxy-5-sulphophenyl)-N'-(2'-carboxy-4'-sulphophenyl)-ms-(4"-aminoacetylaminophenyl)formazan.

In class (xi)

4-amino-4'-nitrostilbene-2,2'-disulphonic acid
4-ω-(N-methylamino)acetylaminostilbene-2,2'-disulphonic acid In class (xii)

3,10-diamino-6,13-dichlorotriphendioxazine-4,11-disulphonic acid
3,10-bis(4'-amino-3'-sulphoanilino)-6,13-dichlorotriphendioxazine-4,11-disulphonic acid
3,10-bis-(4'-amino-2',5'-disulphoanilino)-6,13-dichlorotriphendioxazine-4,11-disulphonic acid
3-(4'-amino-3'-sulphoanilino)-10-(4'-amino-2',5'-disulphoanilino)-6,13-dichlorotriphendioxazine-4,11-disulphonic acid
3,10-di-(2'-aminoethylamino)-6,13-dichlorotriphendioxazane-4,11-disulphonic acid
3,10-bis(3'-amino-4'-sulphoanilino)-6,13-dichlorotriphendioxazine-4,11-disulphonic acid In class (xiii)

Anhydro-9-(4-amino-3-sulphoanilino)-5-anilino-7-phenyl-4-sulpho or 2,4- 4,11-disulphobenz[a]phenazinium hydroxide
Anhydro-9-(4-amino-3-sulphoanilino(-5-p-toluidino-7-p-tolyl-2,4-disulphobenz[a]phenazinium hydroxide
Anhydro-9-(4-amino-3-sulphoanilino)-5-p-toluidino-7-p-methoxyphenyl-2,4-disulphobenz[a]phenazinium hydroxide
Anhydro-3-(4-amino-3-sulphoanilino)-7-N-ethyl-N-(3 or 4-sulphobenzylamino-5-(2, 3 or 4-sulphophenyl)-phenazinium hydroxide
Anhydro-3-(4-amino-3-sulphoanilino-7-N-ethyl-N-(3 or 4-sulphobenzyl)amino-1-methyl or methoxy-5-(2-sulphophenyl)phenazinium hydroxide
Anhydro-3-(4-amino-3-sulphoanilino)-7-1-N-ethyl-N-(3 or 4-sulphobenzyl)amino-5-)4-chloro, methoxy or methyl-3-sulphophenyl)phenazinium-hydroxide
Anhydro-5-(4-amino-2,5-disulphoanilino)-9-diethylamino-7-phenyl-10-sulphobenz[a]phenazinium hydroxide
Anhydro-3,7-bis[N-ethyl-N-(3 or 4-sulphobenzyl)]-5-(3- or 4-amino-4 or 3-sulphophenyl)phenazinium hydroxide
Anhydro-3-(4-amino-3-sulphoanilino)-7-N-ethyl-N-(2-sulphoethyl)amino-5-(2,3 or 4-sulphophenyl)-phenazinium hydroxide
Anhydro-3-(4-amino-3-sulphoanilino)-7-N-methyl-N-(2-sulphoethyl)-5-(3 or 4-amino-4 or 3-sulphophenyl)-phenazinium hydroxide As examples of compounds of formula (2) which may be used in the process of the invention there may be mentioned:
2,4,6-trifluoro-5-chloroisophthalonitrile
2,4,6-trifluoro-5-nitroisophthalonitrile
2,4,5,6-tetrafluoroisophthalonitrile
2,4,5,6-tetrachloroisophthalonitrile
1,3,5-tricyano-2,4,6-trifluorobenzene
1,3,5-tricyano-2,4,6-trichlorobenzene It will be appreciated that the halo-1,3-cyanobenzene intermediate of formula (2) may be hydrolysed during the manufacture of the reactive dye in an aqueous medium and this is clearly undesirable. The chromophoric compound used in the process of the present invention should be selected to be sufficiently reactive towards the compound of formula (2) used so that the dye of formula (1) can be formed with a minimum of concomitant hydrolysis of the halogen atoms on the 1,3-cyanobenzene nucleus.

The present invention provides a further process for the manufacture of dyes of formula (1) which comprises reacting a compound of formula (2) with a precursor of a chromophoric compound which contains one or more OH, SH or

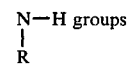
groups and converting the resulting product into a chromophoric compound of formula (1).

This further process is particularly applicable to dyes of formula (1) containing azo groups. The compound of formula (2) is reacted with a diazotisable amine or coupling component having a suitable OH, SH or

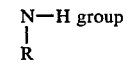
group and the resulting intermediate converted to an azo dye by respectively diazotising and coupling with a coupling component or by coupling with a diazotised amine. In suitable instances both the diaztisable amine and coupling component may be reacted with a compound of formula (21) before being coupled together to form an azo dye of formula (1) in which n is at least 2.

As examples of suitable diazotisable amines for use in the further process of the present invention there may be mentioned 2-sulpho-4- or 5-aminoaniline. It will be appreciated that such compounds are reacted with only one mole of the compound of formula (2) to leave one amine group available for diazotisation.

As examples of suitable coupling components for use in the further process of the present invention there may be mentioned:
1-amino-8-hydroxy-3,6-disulphonaphthalene
2-amino-5-hydroxy-7-sulphonaphthalene
2-amino-8-hydroxy-6-sulphonaphthalene
3-aminocarbonyl-1-(β-aminoethyl)-6-hydroxy-4-methylpyrid-2-one.

The dyestuffs of the present invention may be used for colouring a wide range of textile materials containing hydroxyl or amino groups, e.g. wool, silk, synthetic polyamides and natural or regenerated cellulose, for example cotton or viscose rayon materials, by the conventional methods used for colouring such materials with water-soluble reactive dyes, e.g. in the case of cellulose they are preferably applied in conjunction with a treatment with an acid-binding agent, e.g. caustic soda, sodium carbonate, phosphate, silicate or bicarbonate, which may be applied to the cellulose textile materials before, during or after the application of the dyestuff. The method, technique and conditions used for applying the dyestuff to the textile material will be selected according to various factors, e.g. the nature of the fibre or fibres present and the physical form of the textile material, for example methods will vary depending on whether the fibre is loose or spun into thread which in turn may be in hanks or wound on bobbins or converted into cloth or garments by knitting or weaving. Any of the usual methods of dyeing or printing may be employed to apply the dye to the textile material and other dyestuffs and/or pigments may be also applied simultaneously or sequentially with the dyestuffs of the present invention using such combinations of conditions as are dictated by the properties of the dyestuffs and/or pigments. Such mixed dyeings are particularly valuable if the textile containing OH or $NH_2$ groups is blended with other textile fibres free from such groups, e.g. polyesters. The dyeing may be carried out in a batch-wise manner using, for example, exhaustion techniques in a beck, winch, jet, paddle or jig device, in particular for hanks, woven or knitted fabrics or garments; or it may be applied by a "package" dyeing technique to fibres would in cakes or on cones, bobbins or warp beams, especially when these supports are perforated, or to loose fibres enclosed in permeable containers such as cages, pressure and/or vacuum may be employed to facilitate penetration and circulation through the packages. Alternatively, continuous or semi-continuous dyeing methods may be employed, such as those employing padding techniques, e.g. by padding mangles whereby the textile material is impregnated with dye liquor and then passed through rollers to conrtrol the amount of liquor retained, followed by one or more of a variety of post-treatments, e.g. drying, jig or winch development, baking, steaming, repadding in further solutions such as acid-binding agents as mentioned above, storage in a moist condition at ambient or elevated temperatures passing over heated rollers or passing through batchwise or continuous washing procedures. These post-treatments may also incorporate finishing stages at which, for example, antistatic or crease-resistance agents can be incorporated. Textiles in sheet form may also be coloured by textile printing methods such as printing with engraved or embossed rollers or through screens or by transfer techniques such as wet transfer printing. Details of these and other suitable printing methods are described in "The Principles and Practise of Textile Printing" by E. Knecht, J. B. Fothergill and G. Hurst, 4th Edition 1952 published by Griffin or in "An Introduction to Textile Printing" by W. Clarke, 4th Edition 1974, published by Newnes Butterworth.

The dyestuffs of the present invention show advantageous properties, for example they may be fixed to cellulose fibres at relatively low temperatures and the resulting dyed fibres show good fasteness to wet treatments such as washing and in particular show a good resistance to "acid-bleeding". Some dyes of the present invention are best fixed at somewhat higher temperatures, e.g. 60° C. or even 80° C. when they often show desirable properties as good or better than, for example, conventional monochlorotriazinyl reactive dyes.

The invention is illustrated but not limited by the following Examples in which all parts and percentages are by weight and wt/vol ratios are in the proportion kg/liter.

EXAMPLE 1

8.62 Parts of 1-hydroxy-2(1-sulphonaphth-2-ylazo)-8-ω-(N-methylamino)acetylaminonaphthylene-3,6-disulphonic acid is dissolved in 100 parts of water at 20° C. and 2.8 parts of 5-chloro-2:4:6-trifluoro-isophthalonitrile dissolved in 20 parts of acetone is added all at once. The reaction is stirred at 40°–45° C. and the pH maintained at 7.5–8.0 by the addition of 2 N sodium carbonate solution as required until complete. The solution is salted (20% w/v), filtered and dried to give 7.9 parts of the product.

When used to dye cotton from aqueous dyebaths at 40° C. in the presence of salt and soda ash it gives an attractive red shade with excellent fastness properties.

The 1-hydroxy-2(1-sulphonaphthylazo)-8-ω-(N-methylamino)acetylaminonaphthylene-3:6-disulphonic acid used in the above example is prepared by coupling diazotised 2-aminonaphthalene-1-sulphonic acid on to 1-hydroxy-8-N-methylaminoacetylaminonaphthalene-3:5-disulphonic acid in aqueous solution at pH 6–7.

The 1-hydroxy-8-ω-(N-methylamino)acetylaminonaphthalene-3:6-disulphonic and itself is prepared as follows:

148 Parts of 1-hydroxy-8-aminonaphthalene-3:6-disulphonic acid is dissolved in 2000 parts of water containing 200 parts of sodium acetate crystals at 35° C. After cooling the solution to 0°–5° C. a solution of 66 parts of chloroacetyl chloride in 60 parts of acetone is added dropwise over 20 minutes keeping the temperature at 0°–5° C. Following this addition the mixture is allowed to stir from 1½ hours before the addition of salt (15% w/v). The precipitate so obtained is collected by filtration and washed with 1000 parts of 15% salt solution. The wet paste is added to 250 parts of methylamine solution (40%) keeping the temperature below 30° C., the mixture subsequently being stirred overnight at 20° C. Concentrated hydrochloric acid is added until the mixture is just acid. The solid is collected by filtration and recrystallised from water to give 82.5 parts of product as a colourless solid.

The following table gives further Examples of dyestuffs which may be obtained by replacing the 8.62 parts of 1-hydroxy-2-(1-sulphonaphth-2-ylazo)-8-ω-(N-methylaminoacetylaminonaphthalene-3:6-disulphonic acid with an equivalent amount of the compound listed in Column II of the table and replacing the 2.8 parts of 5-chloro-2:4:6-trifluoro-isophthalonitrile by an equivalent amount of the halogenated aromatic compound listed in Column III of the table. Column IV indicates the colour of the resultant dyeing on cotton.

| I | II | III | IV |
|---|---|---|---|
| 2 | trisodium salt of 1-hydroxy-2-(2-sulphophenylazo)-8-ω-(N-methylamino)acetylaminonaphthalene-3:6-disulphonic acid. | 5-chloro-2:4:6-trifluoro-isophthalonitrile | yellowish-red |
| 3 | tetrasodium salt of 1-hydroxy-2-(1,5-disulphonaphth-2-yl-azo)-8-ω-(N-methylamino)acetylaminonaphthalene-3,6-disulphonic acid. | 5-chloro-2:4:6-trifluoro-isophthalonitrile | bluish-red |
| 4 | disodium salt of 1-hydroxy-2-phenylazo-8-ω-(N-methylamino)-acetylamino naphthalene-3:6-disulphonic acid. | 5-chloro-2:4:6-trifluoro-isophthalonitrile | red |
| 5 | trisodium salt of 1-hydroxy | 5-chloro-2:4:6-tri |  |

-continued

| I | II | III | IV |
|---|---|---|---|
| | 2-(4-methoxy-2-sulphophenyl-azo)-8-ω-(N-methylamino-acetylaminonaphthalene-3:6-disulphonic acid. | fluoroisophthalonitrile | rubine |
| 6 | tetrasodium salt of 1-hydroxy-2-(2:5-disulphophenylazo)-8-ω-(N-methylamino)acetylamino naphthalene-3:6-disulphonic acid. | 5-chloro-2:4:6-trifluoroisophthalonitrile. | red |
| 7 | tetrasodium salt of 1-hydroxy-2-(2:5-disulphophenylazo)-8-ω-(N-methylamino)acetylamino naphthalene-3:6-disulphonic acid. | 2:4:6-trifluoro-1:3:5-tricyanobenzene | red |
| 8 | trisodium salt of 1-hydroxy-2-(1-sulphonaphth-2-ylazo)-8-ω-(N-methylamino)acetylamino naphthalene-3:6-disulphonic acid. | 2:4:6-trifluoro-1:3:5-tricyanobenzene | bluish red |
| 9 | trisodium salt of 1-hydroxy-2-(1-sulphonaphth-2-ylazo)-8-ω-(N-methylamino)acetylamino naphthalene-3:6-disulphonic acid. | 2:4:6-trichloro-1:3:5-tricyanobenzene | bluish-red |
| 10 | trisodium salt of 1-hydroxy-2-(1-sulphonaphth-2-ylazo)-8-ω-(N-ethylamino)acetylaminonaphthalene-3,6-disulphonic acid | 5-chloro-2:4:6-trifluoroisophthalonitrile | bluish-red |
| 11 | trisodium salt of 1-hydroxy-2-(1-sulphonaphth-2-ylazo)-8-ω-(N-ethylamino)acetylaminonaphthalene-3,6-disulphonic acid | 2:4:6-trifluoro-1:3:5-tricyanobenzene | bluish-red |
| 12 | trisodium salt of 1-hydroxy-2-(1-sulphonaphth-2-ylazo)-8-ω-(N-butylamino)acetylaminonaphthalene-3,6-disulphonic acid. | 5-chloro-2:4:6-trifluoroisophthalonitrile. | bluish-red |
| 13 | trisodium salt of 1-hydroxy-2-(1-sulphonaphth-2-ylazo)-8-ω-(N-benzylamino)acetyl-amino-naphthalene-3,6-disulphonic acid. | 5-chloro-2:4:6-trifluoroisophthalonitrile | bluish red |
| 14 | trisodium salt of 1-hydroxy-2-(1-sulphonaphth-2-ylazo)-8-ω-(N-butylamino)propionylaminonaphthalene-3,6-disulphonic acid | 5-chloro-2:4:6-trifluoroisophthalonitrile | bluish red |
| 15 | trisodium salt of 1-hydroxy-2-(1-sulphonaphth-2-ylazo)-8-ω-(N-methylamino)acetylaminonaphthalene-4,6-disulphonic acid. | 5-chloro-2:4:6-trifluoroisophthalonitrile | bluish red |
| 16 | disodium salt of 1-hydroxy-2-(4-methoxy-2-sulphophenylazo)-6-ω-(N-methylamino)-acetylaminonaphthalene-3-sulphonic acid. | 5-chloro-2:4:6-trifluoroisophthalonitrile | scarlet |
| 17 | disodium salt of 1-hydroxy-2-(4-methoxy-2-sulphophenylazo)-6-ω-(N-methylamino)-acetylaminonaphthalene-3-sulphonic acid. | 2:4:6-trifluoro-1:3:5-tricyanobenzene | scarlet |
| 18 | trisodium salt of 1-hydroxy-2-(1,5-di-sulphonaphthyl-2-ylazo)-6-ω-(N-methyl-amino)acetylaminonaphthalene-3-sulphonic acid. | 2:4:6-trifluoro-1:3:5-tricyanobenzene | Orange |
| 19 | trisodium salt of 1-hydroxy-2-(1,5-disulphonaphthyl-2-ylazo)-6-ω-(N-methylamino)-acetyl-aminonaphthalene-3-sulphonic acid. | 5-chloro-2:4:6-trifluoroisophthalonitrile. | orange |
| 20 | trisodium salt of 1-hydroxy-2-(1,5-di sulphonaphth-2-yl-azo)-6-ω-(N″-methylamino)-N-acetyl-N-methylaminonaphthalene-3-sulphonic acid | 5-chloro-2:4:6-trifluoroisophthalonitrile. | orange |
| 21 | trisodium salt of 1-hydroxy-2-(1,5-disulphonaphth-2-yl-azo-7-ω-(N-methylamino)-acetylaminonaphthalene-3-sulphonic acid. | 5-chloro-2:4:6-trifluoroisophthalonitrile. | red |
| 22 | trisodium salt of the copper complex of 1-hydroxy-2-(3-chloro-5-sulpho-2-hydroxyphenylazo-8-ω-(N-methylamino)acetylamino naphthalene-3,6-disulphonic acid. | 5-chloro-2:4:6-trifluoroisophthalonitrile. | violet |
| 23 | trisodium salt of the copper complex of 1-hydro hydroxy-2-(3,5-disulpho-2-hydroxyphenylazo-6-ω-(N-methylamino)acetyl-aminonaphthelene-3-sulphonic acid. | 5-chloro-2:4:6-trifluoroisophthalonitrile. | rubine |
| 24 | trisodium salt of the copper complex of 1-hydroxy-2-4-(2,5-disulphophenylazo)5-methyl-2-hydroxyphenyl-azo-6-ω-(N-methylamino-acetylaminonaphthalene-3-sulphonic acid. | 5-chloro-2:4:6-trifluoroisophthalonitrile. | navy-blue |
| 25 | trisodium salt of 2-(4-methylaminoacetylamino-2-ureidophenylazo) naphthalene-3,6,8-trisulphonic acid. | 5-chloro-2:4:6-trifluoroisophthalonitrile. | yellow |
| 26 | trisodium salt of 1-(4-sulphophenyl)-3-carboxy-4-(4-methylaminoacetylamino-2-sulphophenylazo)-5-pyrazolone. | 5-chloro-2:4:6-trifluoroisophthalonitrile. | yellow |
| 27 | trisodium salt of 1-(3-methylaminoacetylaminophenyl)-3-carboxy-4-(1,5-disulphonaphth-2-ylazo)-5-pyrazolone. | 5-chloro-2:4:6-trifluoroisophthalonitrile. | yellow |
| 28 | disodium salt of 2-(4-methylaminoacetylamino-2-ureidophenylazo)naphthalene-6:8-disulphonic acid. | 2:4:5:6-tetrafluoroisophthalonitrile. | yellow |

EXAMPLE 29

7.7 Parts of the condensation product obtained by the reaction of 5-chloro-2:4:6-trifluoroisophthalonitrile with 2-sulpho-5-aminoaniline is stirred in 200 parts of water, dissolved by the addition of 2 N sodium carbonate solution and cooled to 0°–5° C. 7 Parts of concentrated hydrochloric acid are added and the suspension formed is diazotised by the dropwise addition of 10 parts of 2N sodium nitrite solution keeping the temperature at 0°–5°

C. The mixture is stirred for a further 2 hours at 0°–5° C. then added portionwise to a solution of 14.8 parts of the tetrasodium salt of 1-hydroxy-7-(1,5-disulphonaphth-2-ylazo)-8-aminonaphthalene-3,6-disulphonic acid dissolved in 200 parts of water maintaining the pH at 7–8 by additions of 2N sodium carbonate solution as required and the temperature at 0°–5° C. The mixture was stirred overnight at 0°–5° C., salted (20% w/v), filtered and dried.

The product is a blue dyestuff which dyes cotton at 40° C. a navy blue shade with excellent fastness properties.

The condensation of 5-chloro-2:4:6-trifluoroisophthalonitrile with 2-sulpho-5-aminoaniline is conducted as follows:

9.75 Parts of 2-sulpho-5-aminoaniline is dissolved by the addition of 2N sodium carbonate. To this solution at 20° C. is added a solution of 10.8 parts of 5-chloro-2:4:6-trifluoroisophthalonitrile in acetone. The pH is maintained at 5.6 and the temperature at 20° for five hours. The solution so obtained is screened and acidified to pH 3–3.5, the precipitate collected by filtration and dried to give 14.5 parts of product.

The following Table gives further Examples of dyestuffs of the invention which may be obtained by replacing the 14.8 parts of the tetrasodium salt of 1-hydroxy-7-(1:5-disulphonaphth-2-ylazo)-8-aminonaphthalene-3:6-disulphonic acid with an equivalent amount of the compound listed in Column II of the table and replacing 7.7 parts of 5-chloro-2:4:6-trifluoroisophthalonitrile by an equivalent amount of the halogenated aromatic compound listed in Column III of the table. Column IV indicates the colour of the resultant dye on cotton.

| I | II | III | IV |
|---|---|---|---|
| 30 | tetrasodium salt of 1-hydroxy-7-(2:5-disulphophenylazo)-8-aminonaphthalene-3:6-disulphonic acid. | 5-chloro-2:4:6-trifluoroisophthalonitrile. | blue |
| 31 | tetrasodium salt of 1-hydroxy-7-(2:5-disulphophenylazo)-8-aminonaphthalene-3:6-disulphonic acid. | 2:4:6-trifluoro-1:3:5 tricyanobenzene. | blue |
| 32 | tetrasodium salt of 1-hydroxy-7-(1:5-disulphonaphth-2-ylazo)-8-aminonaphthalene-3:6-disulphonic acid. | 2:4:6-trifluoro-1:3:5 tricyanobenzene. | blue |
| 33 | disodium salt of 1-(4-sulphophenyl)-3-carboxy-5-pyrazolone | 5-chloro-2:4:6-trifluoroisophthalonitrile | yellow |
| 34 | disodium salt of 2-naphthol-3,6-disulphonic acid. | 5-chloro-2:4:6-trifluoroisophthalonitrile | Orange |
| 35 | monosodium salt of 1-acetylamino-8-naphthol-3,6-disulphonic acid | 5-chloro-2:4:6-trifluoroisophthalonitrile | red |

EXAMPLE 36

7.5 Parts of the trisodium salt of 1-hydroxy-2(-b sl-sulpho-5-aminomethylnaphth-2-ylazo)-8-benzoylamino naphthalene-3:5-1-disulphonic acid (prepared as described in Example 3 of UK Pat. No. 1,431,322) is dissolved in 1400 parts of water at 30° C. and 2.5 parts of 5-chloro-2:4:6-trifluoroisophthalonitrile dissolved in 20 parts of acetone is added. The stirred mixture is maintained at pH 7.5–8.0 by the addition of 2N caustic soda solution as required and the temperature maintained at 30° C. until the reaction complete. The solution is salted (5% w/v) filtered and dried to give 7.6 parts of the product.

When used to dye cotton from aqueous dyebaths at 40° C. in the presence of salt a soda ash it gives on attractive red shade with excellent fastness properties.

The following table gives further Examples of dyestuffs of the invention which may be obtained by replacing the 7.5 parts of the trisodium salt of 1-hydroxy-2-(-sulpho-5-aminomethylnaphth-2-ylazo)-8-benzoylaminonaphthalene-3:5-disulphonic acid by an equivalent amount of the compound listed in Column II of the table and by replacing the 2.5 parts of 5-chloro-2:4:6-trifluoroisophthalonitrile by an equivalent amount of the halogeno aromatic compound listed in Column III of the table. Column IV indicates the colour of the resultant dyeing on cotton.

| I | II | III | IV |
|---|---|---|---|
| 37 | trisodium salt of 1-hydroxy-2-(1-sulpho-5-aminomethylnaphth-2-ylazo)-8-benzoyl-aminonaphthalene-3,6-disulphonic acid. | 5-chloro-2:4:6-tri fluoroisophthalonitrile | Red |
| 38 | trisodium salt of 1-hydroxy-2-(1-sulpho-5-aminomethylnaphth-2-ylazo)-8-benzoyl-aminonaphthalene-3,6-disulphonic acid. | 2:4:6-trifluoro-1:3:5-tricyano-benzene | Red |
| 39 | trisodium salt of 1-hydroxy-2-(1-sulpho-5-aminomethylnaphth-2-ylazo)-8-benzoyl-aminonaphthalene-3,5-sulphonic acid | 2:4:6-trifluoro-1:3:5-tricyano-benzene | Red |
| 40 | disodium salt of 1-(2,5-dichloro-4-sulphophenyl)-3-methyl-4-(1-sulpho-5-aminomethylnaphth-2-ylazo)-5-pyrazolone | 5-chloro-2:4:6-trifluoroiso-phthalonitrile | Yellow |
| 41 | disodium salt of 1-(4-sulphophenyl)-3-carboxy-4-(1-sulpho-5-aminomethyl-naphth-2-ylazo)-5-pyrazolone | 5-chloro-2:4:6-trifluoroiso-phthalonitrile | Yellow |
| 42 | tetrasodium salt of 1-hydroxy-2-(5-aminomethyl-1:7-disulphonaphth-2-ylazo) 8-benzoylaminonaphthalene-3:5-disulphonic acid. | 5-chloro-2:4:6-trifluoroiso-phthalonitrile | |
| 43 | tetrasodium salt of 1-hydroxy-2-(5-aminomethyl-1:7-disulphonaphth-2-ylazo) 8-benzoylaminonaphthalene-3:5-disulphonic acid. | 2:4:6-trifluoro-1:3:5-tricyano benzene | Red |
| 44 | tetrasodium salt of 1-hydroxy-2-(5-aminomethyl-1:7-disulphonaphth-2-ylazo)-8-benzoylamino-naphthalene-3:6-di-sulphonic acid. | 2:4:6-trifluoro-1:3:5-tricyano benzene | Red |
| 45 | tetrasodium salt of 1-hydroxy-2-(5-aminomethyl-1,7-disulphonaphth-2-ylazo)-8-benzoylamino-naphthalene-3:6-disulphonic acid. | 5-chloro-2:4:6-trifluoroiso-phthalonitrile | Red |
| 46 | disodium salt of 1-hydroxy 2-(1-sulpho-5-aminomethyl-naphth-2-ylazo)-6-acetyl-aminonaphthalene-3-sulphonic acid. | 5-chloro-2:4:6-trifluoroiso-phthalonitrile | Orange |
| 47 | disodium salt of 1-hydroxy-2-(1-sulpho-5-aminomethylnaphth-2-ylazo)-6-(N-acetyl-N-methylamino)naphtha- | 5-chloro-2:4:6-trifluoroiso-phthalonitrile | Orange |

| I | II | III | IV |
|---|---|---|---|
| | lene-3-sulphonic acid. | | |
| 48 | Trisodium salt of 1-hydroxy-2-(5-aminomethyl-1:7-disulphonaphth-2-ylazo)-6-acetylaminonaphthalene-3-sulphonic acid. | 5-chloro-2:4:6-trifluoroisophthalonitrile | Orange |
| 49 | Trisodium salt of 1-hydroxy-2-(5-aminomethyl-1:7-disulphonaphth-2-ylazo)-6-ureido naphthalene-3-sulphonic acid. | 5-chloro-2:4:6-trifluoroisophthalonitrile | Orange |
| 50 | disodium salt of 1-hydroxy-2-(1-sulpho-5-aminomethyl-naphth-2-ylazo)-7-acetylaminonaphthalene-3-sulphonic acid | 5-chloro-2:4:6-trifluoroisophthalonitrile | Red |
| 51 | tetrasodium salt of 1-hydroxy-2-[4-(1-sulpho-5-aminomethylnaphth-2-ylazo-6-sulphonaphth-1-ylazo]-8-acetylaminonaphthalene-3,6-disulphonic acid. | 5-chloro-2:4:6-trifluoroisophthalonitrile | Red |
| 52 | pentasodium salt of 1-hydroxy-2-(1-sulpho-5-aminomethylnaphth-2-ylazo)-7-(2,5-disulphophenylazo)-8-aminonaphthalene-3,6-disulphonic acid. | 5-chloro-2:4:6-trifluoroisophthalonitrile | navy-blue |
| 53 | trisodium salt of 1-hydroxy-2-(1-sulpho-5-aminomethyl-naphth-2-ylazo)-8-acetyl-aminonaphthalene-3,6-disulphonic acid. | 2:4:5;6-tetrafluoro isophthalonitrile | bluish-red |
| 54 | trisodium salt of 1-hydroxy-2-(1-sulpho-5-aminomethylnaphth-2-ylazo)-8-acetylaminonaphthalene-3,6-disulphonic acid. | 2:4:6-trifluoro-1:3:5-tricyanobenzene | red |
| 55 | The tetrasodium salt of 1-hydroxy-2-(5-aminomethyl-1:7-disulphonaphth-2-ylazo)-8-acetylaminonaphthalene-3:6-disulphonic acid. | 2:4:6-trifluoro-1:3:5-tricyanobenzene | bluish-red |
| 56 | The tetrasodium salt of 1-hydroxy-2-(5-aminomethyl-1:7-disulphonaphth-2-ylazo)-8-acetylaminonaphthalene-3:6-disulphonic acid. | 5-chloro-2:4:6-trifluoroisophthalonitrile | |
| 57 | trisodium salt of 1-hydroxy-2-[4-(5-aminomethyl-4-methyl-2-sulphophenylazo)-6-sulphonaphth-1-ylazo] 6-acetylaminonaphthalene-3-sulphonic acid | 5-chloro-2:4:6-trifluoroisophthalonitrile | blue violet |
| 58 | trisodium salt of the copper complex of 1-hydroxy-2-4-(5-aminomethyl-4-methyl-2-sulphophenylazo)-5-methyl-2-hydroxyphenylazo-8-acetylaminonaphthalene-3,6-disulphonic acid | 5-chloro-2:4:6-trifluoroisophthalonitrile | navy blue |
| 59 | tetrasodium salt of 1-hydroxy-2-[4-(4-aminoethyl-2-sulphophenylazo)-2-methoxy-phenylazo] naphthalene-3,6,8-trisulphonic acid. | 5-chloro-2:4:6-trifluoroisophthalonitrile | blue violet |
| 60 | disodium salt of 5-(5-aminomethyl-4-methyl-2-sulphophenylazo)-1-ethyl-6-hydroxy-4-methyl-3-sulphopyrid-2-one | 5-chloro-2:4:6-trifluoroisophthalonitrile | yellow |
| 61 | pentasodium salt of 1-hydroxy-2-(5-aminoethyl-4-methyl-2-sulphophenylazo)-7-(1,5-disulphonaphth-2-ylazo)-8-aminonaphthalene-3,6-disulphonic acid. | 5-chloro-2:4:6-trifluoroisophthalonitrile | navy blue |
| 62 | tetrasodium salt of 1-hydroxy-2-(2:4-disulpho 5-aminomethylphenylazo)-8-acetylaminonaphthalene-3:6-disulphonic acid. | 5-chloro-2:4:6-trifluoroisophthalonitrile | red |
| 63 | tetrasodium salt of 1-hydroxy-2-(2:4-disulpho 5-aminomethylphenylazo)-8-acetylaminonaphthalene-3:6-disulphonic acid. | 2:4:6-trifluoro-1:3:5-tricyanobenzene | red |
| 64 | tetrasodium salt of 1-hydroxy-2-(2:4-disulpho-5-aminomethylphenylazo)-8-benzoylaminonaphthalene-3:6-disulphonic acid | 2:4:6-trifluoro-1:3:5-tricyanobenzene | red |
| 65 | tetrasodium salt of 1-hydroxy-2-(2:4-disulpho-5-aminomethylphenylazo)-8-benzoylaminonaphthalene-3:6-disulphonic acid | 2:4:6-trichloro-1:3:5-tricyanobenzene | red |
| 66 | tetrasodium salt of 1-hydroxy-2-(2:4-disulpho-5-aminomethylphenylazo)-8-benzoylaminophthalene-3:6-disulphonic acid | 5-chloro-2:4:6-trifluoroisophthalonitrile | red |
| 67 | tetrasodium salt of 1-hydroxy-2-(2:4-disulpho-5-aminomethylphenylazo)-8-benzoylaminonaphthalene 3:5-disulphonic acid | 5-chloro-2:4:6-trifluoroisophthalonitrile | |
| 68 | tetrasodium salt of 1-hydroxy-2-(2:4-disulpho-5-aminomethylphenylazo)-8-benzoylaminonaphthalene 3:5-disulphonic acid | 2:4:6-trifluoro-1:3:5-tricyanobenzene | |
| 69 | tetrasodium salt of 1-hydroxy-2-(2:4-disulpho-5-N-methylaminomethylphenylazo)-8-acetylamino naphthalene-3:6-disulphonic acid | 5-chloro-2:4:6-trifluoroisophthalonitrile | red |
| 70 | disodium salt of 4-(2:4-disulpho-5-N-methylaminomethylphenylazo)-3-ureido aniline | 5-chloro-2:4:6-trifluoroisophthalonitrile | yellow |
| 71 | disodium salt of 1-phenyl 3-methyl-4-(2:4-disulpho 5-N-methylaminomethylphenylazo)-5-aminopyrazole. | 5-chloro-2:4:6-trifluoroisophthalonitrile | yellow |
| 72 | disodium salt of 2:6-diamino-3-(2:4-disulpho-5-N-methylaminomethylphenylazo)-4-methyl-5-cyanopyridine. | 5-chloro-2:4:6-trifluoroisophthalonitrile | yellow |
| 73 | disodium salt of 2:6-diamino-3-(2:4-disulpho-5-N-methylaminomethylphenylazo)-4-methyl-5-cyanopyridine. | 2:4:6-trifluoro-1:3:5-dicyanobenzene | yellow |
| 74 | the hexasodium salt of 1-hydroxy-2-(2:4-disulpho-5-aminomethylphenylazo)-7-(1:5-disulphonaphth-2-ylazo)- | 2:4:6-trifluoro-1:3:5-dicyanobenzene | blue |

| I | II | III | IV |
|---|---|---|---|
|  | 8-aminonaphthalene-3:6-disulphonic acid. |  |  |
| 75 | the hexasodium salt of 1-hydroxy-2-(2:4-disulpho-5-aminomethylphenylazo)-7-(1:5-disulphonaphth-2-ylazo)-8-aminonaphthalene-3:6-disulphonic acid. | 5-chloro-2:4:6-trifluoroisophthalonitrile | blue |

EXAMPLE 76

6.1 Parts of the trisodium salt of 3-ureido-4-(3:6:8-trisulphonaphth-21-ylazo)aniline is dissolved in 50 parts of water by warming and the solution cooled to 40° C. A solution of 2.2 parts of 5-chloro-2:4:6-trifluroisophthalonitrile in 10 parts of acetone is added to the mixture and the pH maintained at 7-8 by additions of sodium carbonate as required as the temperature at 35°–40° C. until the reaction is essentially complete. Salt (10% w/v) is next added and the precipitated yellow dye collected by filtration and dried in vacuo at 20° C. to give 2.2 parts of product. This dye was used to dye cotton and bright yellow shade by applying at 40° C. in the presence of an acid binding agent.

The following Table gives further examples of dyestuffs of the invention which may be obtained by replacing the 6.1 parts of the trisodium salt of 3-ureido-4-(3:6:8-trisulphonaphth-21-ylazo) aniline by an equivalent amount of the compound listed in Column II of the Table. Column III of the Table indicates the colour produced when resulting dye is applied to cotton.

| I | II | III |
|---|---|---|
| 77 | disodium salt of 1-amino-4-(3-amino-2,4,6-trimethylanilino)anthraquinone-2,5-disulphonic acid. | blue |
| 78 | disodium salt of 6-amino-1-hydroxy-2-(2-sulphophenylazo)naphthalene-3-sulphonic acid | orange |
| 79 | trisodium salt of the copper complex of 6-amino-1-hydroxy-2-[4-(2,5-disulphophenylazo)-2-hydroxy-5-methylphenylazo]naphthalene-3-sulphonic acid. | navy-blue |
| 80 | disodium salt of 2-(4-amino-2-methylphenylazo)-naphthalene-4,8-disulphonic acid. | yellow |
| 81 | disodium salt of 2-(4-amino-2-acetylaminophenyl-azo)naphthalene-5,7-disulphonic acid. | yellow |
| 82 | disodium salt of 4-nitro-4-aminostilbene-2,2-disulphonic acid | yellow |
| 83 | disodium salt of 1-(2-aminoethyl)-3-(1,5-disulphonaphth-2-ylazo)-6-hydroxy-4-methylpyrid-2-one | yellow |
| 84 | trisodium salt of 3-(2-aminoethylsulphamoyl)-copper phthalocyanine-2,2,8,3-trisulphonic acid | turquoise |
| 85 | trisodium salt of the copper complex of N-(2-hydroxy-5-sulpho-3-aminophenyl)-N-(2-carboxy-4-sulphophenyl)-ms-phenylformazan. | blue |
| 86 | disodium salt of 3,10-di-(2-aminoethylamino)-6,13-dichlorotriphendioxazine-4,11-disulphonic acid | blue |
| 87 | trisodium salt of 1-hydroxy-2-(1-sulphonaphth-2-ylazo-8-(3-aminobenzoylamino)-naphthalene-3,6-disulphonic acid | red |
| 88 | trisodium salt of 1-hydroxy-2-(1,5-disulphonaphthyl-2-ylazo)-8-(3-aminobenzoylamino)-naphthalene-3,6-disulphonic acid. | red |

We claim:
1. A dyestuff of the formula:

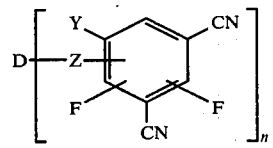

where
D is a chromophoric group,
n is 1 or 2,

where R is H, $C_{1-4}$ alkyl, $C_{1-4}$ alkyl substituted by OH, $OSO_3H$, CN or $SO_3H$ or phenyl, and Y is H, F, Cl, CN, $NO_2$ or $SO_3H$.

2. A dyestuff as claimed in claim 1 wherein the dyestuff contains sufficient $SO_3H$ groups to have a water solubility of at least 5 grams per liter.

3. A dyestuff as claimed in claim 1 wherein Z is linked to an aromatic carbon atom in D.

4. A dyestuff as claimed in claim 1 in which D is of the form D'-Q—W' where D' is a chromophoric group linked at an aromatic carbon atom, Q is a direct link or $NR^3CO$ where $R^3$ is H or $C_{1-4}$alkyl, and W' is $CH_2$ or $CH_2CH_2$.

5. A dyestuff as claimed in claim 1 of the formula:

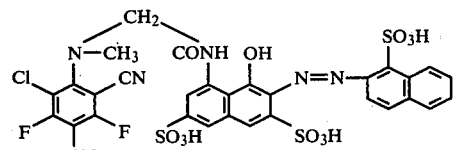

* * * * *